Oct. 7, 1969   D. L. PEFINE   3,470,974
VEHICLE BRAKE APPARATUS
Filed Oct. 22, 1965   2 Sheets-Sheet 1

INVENTOR.
DOMINIC L. PEFINE
BY
CHARLES S. MCGUIRE
ATTORNEY

Oct. 7, 1969    D. L. PEFINE    3,470,974
VEHICLE BRAKE APPARATUS
Filed Oct. 22, 1965    2 Sheets-Sheet 2

INVENTOR.
DOMINIC L. PEFINE
BY
CHARLES S. MCGUIRE
ATTORNEY

United States Patent Office 3,470,974
Patented Oct. 7, 1969

3,470,974
VEHICLE BRAKE APPARATUS
Dominic L. Pefine, 86 Gore St.,
Cambridge, Mass. 02138
Filed Oct. 22, 1965, Ser. No. 500,850
Int. Cl. B60r 25/08; B60t 7/12
U.S. Cl. 180—114                     3 Claims

ABSTRACT OF THE DISCLOSURE

An anti-theft device for a motor vehicle which operates to set the brakes in response to movement of the vehicle when the device is operative; the usual vehicle ignition key may be used to render the device inoperative so that the brakes are not applied in normal operation.

---

This invention relates to improvements in systems for operating a hydraulic brake system of a motor vehicle or the like.

The most common system presently in use for slowing or stopping a moving motor vehicle is a brake system operable by the application of pressure to a foot pedal by the vehicle operator. The pedal is connected through suitable linkage means to a fluid-filled master cylinder to force the fluid through connecting lines to individual cylinders mounted on the wheels. As the fluid enters the individual cylinders, mechanical members are moved outwardly therefrom to force the brake shoes against the drum of the rotating wheel. The speed of rotation is thus diminished by friction between one or more brake shoes and the brake drum which forms a portion of the wheel. Such systems, of course, are exclusively under the control of the vehicle operator and no provision is made to allow slowing or stopping of the vehicle by another passenger in the event of sudden emergency which causes the operator to lose control of the vehicle.

The present invention provides auxiliary means which allow an occupant of the vehicle other than the operator, without having access to the foot operated pedal, to apply the brakes and bring the vehicle to a safe stop. The invention further includes selectively operable means for causing the brakes to be applied in resonse to movement of the vehicle after the latter has been stopped. The auxiliary brake operating means include drive means operable in response to actuation of one of a plurality of actuating means to force the fluid from the brake master cylinder in the same manner as the foot pedal. One of the actuating means preferably includes a member such as a depressible button for selective manual operation while the vehicle is in motion. The other actuating means is preferably operated by a switch movable between on and off positions, and may include a key operated switch.

It is a principal object of the present invention to provide auxiliary means, apart from the usual operator-applied foot pedal, for operating a conventional hydraulic brake system in a novel and improved manner.

A further object is to provide operating means for a hydraulic brake system which may be selectively actuated by an occupant of the vehicle other than the operator to apply the brakes in a safe and efficient manner.

Still another object is to provide operating means for automatically applying the brakes of a vehicle in response to movement of certain essential moving parts thereof when the operating means is in an actuated position.

A still further object is to provide a safe and efficient auxiliary operating means for a conventional hydraulic brake system of a motor vehicle which may be quickly and economically incorporated with such brake systems as are in present commercial use.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
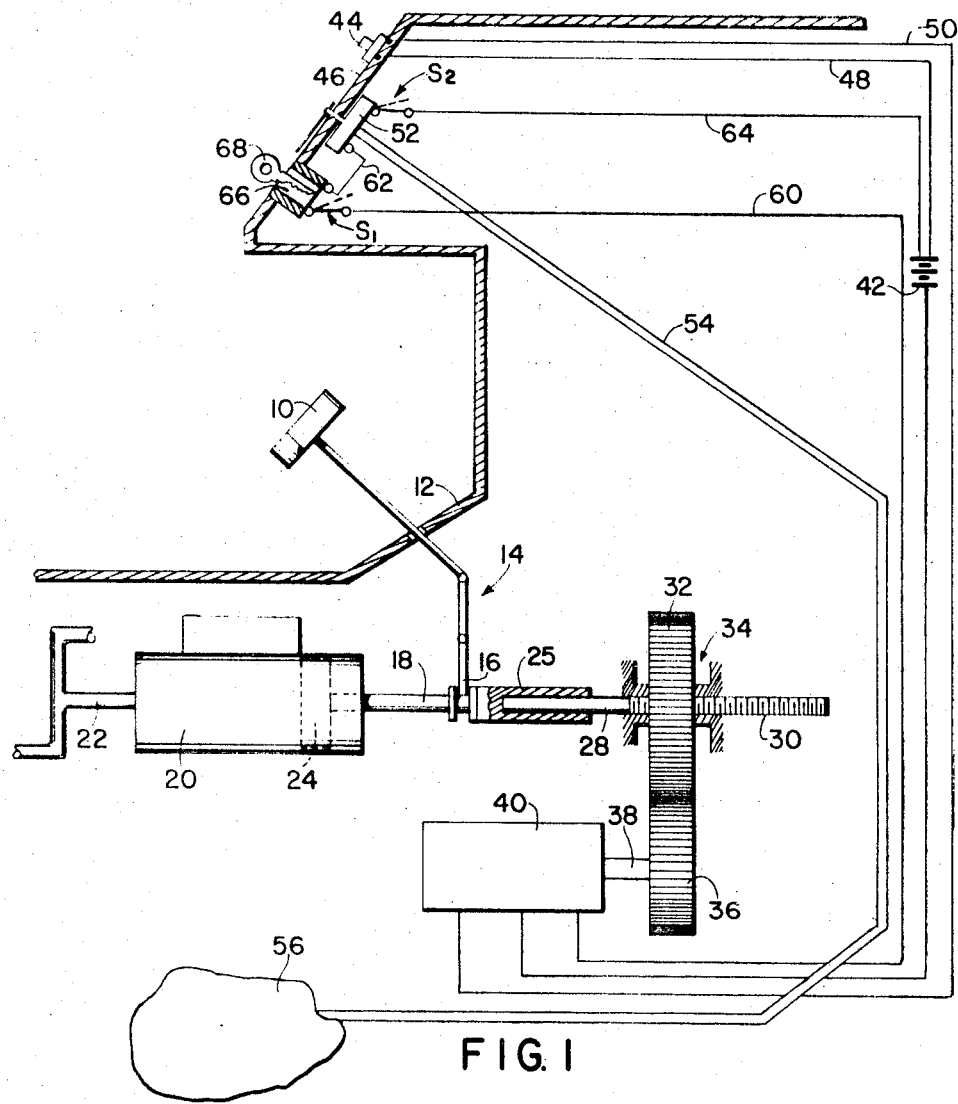
FIGURE 1 is a diagrammatic, elevational view of portions of a motor vehicle or the like comprising a conventional hydraulic brake system with one embodiment of the apparatus of the present invention installed thereon.

Referring now to the drawings in FIG. 1 is shown somewhat diagrammatically portions of a conventional hydraulic brake system for a motor vehicle such as a passenger automobile. The portions shown include brake pedal 10 mounted in the usual manner for engagement by the foot of the vehicle operator. Brake pedal 10 extends through an opening in or near the vehicle floor 12 where it is connected to a suitable linkage apparatus indicated generally by the reference numeral 14. End portion 16 of linkage 14 is connected to shaft 18 by suitable means to that movement of end portion 16 results in linear movement of the shaft. Of course, the brake pedal and any connecting linkage may be constructed and arranged in any of a number of suitable embodiments, the construction shown diagrammatically in FIGS. 1-3 being merely for illustration.

Master brake cylinder 20 is of conventional construction, normally comprising a metal, cylindrical body having an opening in each end and mounted upon the frame or other convenient portion of the vehicle. Cylinder 20 contains a suitable hydraulic brake fluid and communicates through one end with brake line 22 which branches off through individual lines leading to each of the vehicle wheels. Individual cylinders are mounted on each of the wheels, according to conventional practice, and are arranged to apply force to one or more brake shoes, urging the latter into frictional engagement with a portion of the wheels, in response to a flow of brake fluid into the individual cylinders. Piston 24 is carried on the end of shaft 18 internally of master cylinder 20. Movement of piston 24 towards the left as seen in FIG. 1 will force the brake fluid out of master cylinder 20, through line 22 and into each of the individual cylinders. It is readily seen that this action takes place in response to depression of brake pedal 10 by the vehicle operator. When pressure on the brake pedal is released an appropriate spring means (not shown) returns it to its initial position and allows the brake fluid to flow back into master cylinder 20. The brake shoes are normally returned to a position out of engagement with the drums by additional spring means as the fluid is drawn out of the individual brake cylinders.

According to the present invention, a forward extension 25 is provided on shaft 18. This extension includes a central opening 26 (FIG. 2) extending axially from one end into the shaft extension 25. Rod 28 is arranged to extend into opening 26 and includes, on the portion outside the opening, externally threaded portion 30. Gear 32 is rotatably mounted on suitable bearing means indicated diagrammatically at 34. Gear 32 includes an internally threaded central opening through which rod 28 extends with threaded portion 30 engaged therein.

Gear 36 is mounted on output shaft 38 of electric motor 40. A suitable source of electrical power, such as battery 42, is arranged to supply electricity for the operation of motor 40 when the electrical circuit is closed. Operation of motor 40 will rotate gear 36, which in turn will rotate gear 32. Since the latter gear is restrained from axial movement by bearing means 34, rod 28 will be moved linearly in one direction or the other, depending on the direction of rotation of motor 40, through its threaded connection with gear 32. Rotation of motor 40 in such a direction as to cause movement of rod 28 toward the left as seen in FIG. 1 will obviously result in movement of piston 24 toward the left and thus in application of the brakes. It will be noted that this is accomplished without applying pressure to foot pedal 10. Rotation of motor 40 in the opposite direction will result in movement of rod 28 toward the right and will thus allow the spring means to restore the elements of the pedal and linkage to their initial positions, thus releasing the brakes.

Figure 2:
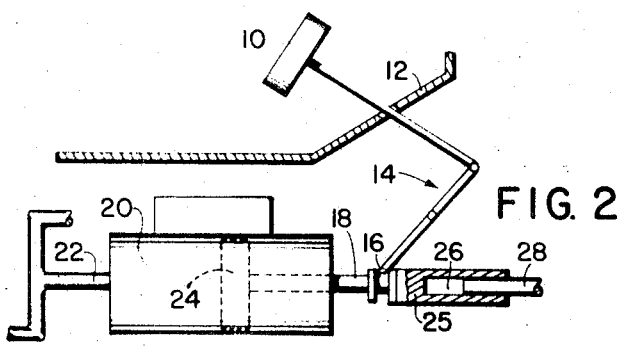
FIG. 2 shows certain portions of the apparatus of FIG. 1 in a second position of movement.

With reference to FIG. 2, it will be noted that the brakes may be applied in the conventional manner, i.e., by applying pressure to foot pedal 10, without movement of rod 28. Due to the arrangement of rod 28 within opening 26, shaft extension 25 may be moved freely toward the left without disturbing the position of rod 28. In the rest position of the elements as in FIG. 1, that is, with the brakes released, the end of rod 28 rests against the bottom of opening 26. Therefore, any movement of the rod toward the left will tend to apply the brakes without applying pressure to foot pedal 10, while still allowing operation of the brakes by means of the foot pedal without movement of rod 28.

Also shown in FIG. 1 is push button 44 arranged on dashboard 46 of the vehicle. Button 44 is spring biased to the outward position, in the usual manner, and may be manually depressed to close a pair of electrical contacts. Electrical leads 48 and 50 connect motor 40 with one terminal of battery 42 through the switch formed by the contacts associated with button 44, and lead 51 connects the motor to the other battery terminal. Thus, depression of button 44 will serve to supply electrical power to motor 40, resulting in application of the brakes, as explained in the preceding paragraphs. Button 44 is preferably arranged on the opposite side of dashboard 46 from the steering wheel so that a passenger other than the driver has within his immediate control application of the brakes.

Conventional speedometer 52 is connected by cable 54 to transmission 56 in the usual manner. Motor 40 is connected to one terminal of battery 42 by electrical lead 51, as mentioned above, and to the other terminal by leads 60, 62 and 64. Switch S1 is interposed in lead 60 and is movable between open and closed positions by means of cylinder 66 which may be moved only when key 68 is inserted therein. Switch S2 is interposed in lead 64 and is biased toward a normally open position, but is closed in response to movement of speedometer 52.

The system comprising key-operated switch S1, speedometer-operated switch S2, motor 40, battery 42 and the associated electrical leads serves as an anti-theft device for the vehicle. The key-operated switch is left in the open position during normal operation of the vehicle; although S2 will be closed by movement of speedometer 52, the brakes will not be applied since switch S1 remains open. When the vehicle is stopped and to be left unattended for some period of time, the operator inserts key 68 and turns it to close switch S1. With switch S1 in the closed position, any unauthorized movement of the vehicle will move speedometer 52, thereby closing switch S2 and applying the brakes. Thus, the system shown in FIGS. 1 and 2, provides means for operating the brakes while the vehicle is moving by someone other than the vehicle operator, should this be necessary for safety purposes, and for applying the brakes in response to movement of the vehicle as an anti-theft measure, after such means have been rendered operative by the operator, or another in possession of the key necessary to effect actuation of the system. Additional means would be provided, of course, such as oppositely wired electrical leads for reversing the direction of rotation of motor 40, to return the elements to the position of FIG. 1 when the brakes are to be released. Such means would preferably be key-operated.

Figure 3:
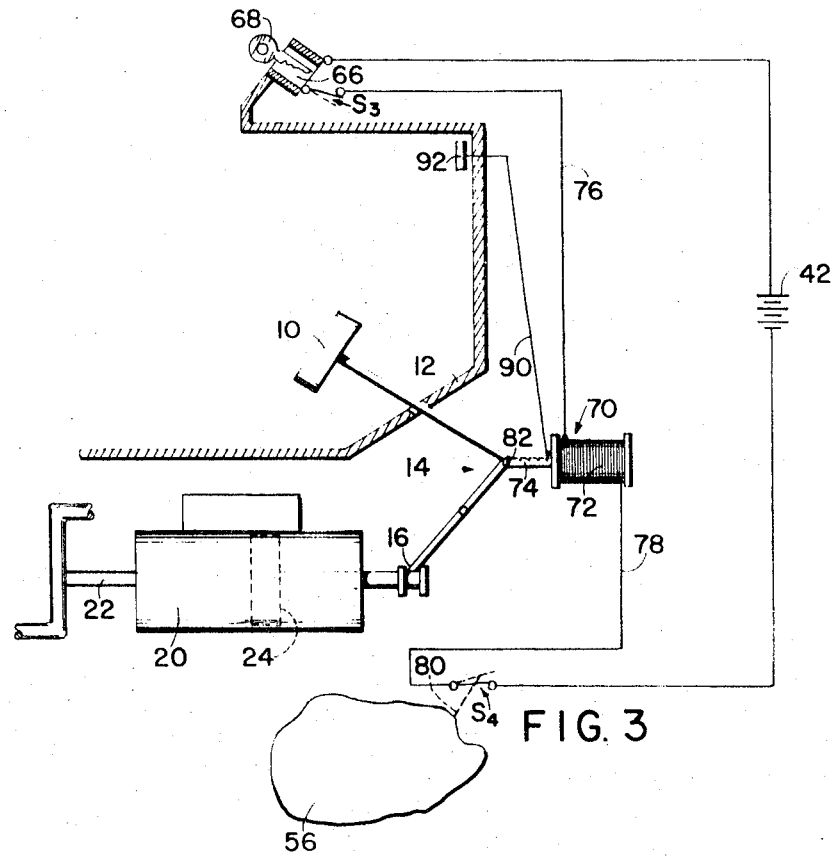
FIG. 3 is a diagrammatic view, as in FIG. 1, of another embodiment of the invention.
Figure 4:
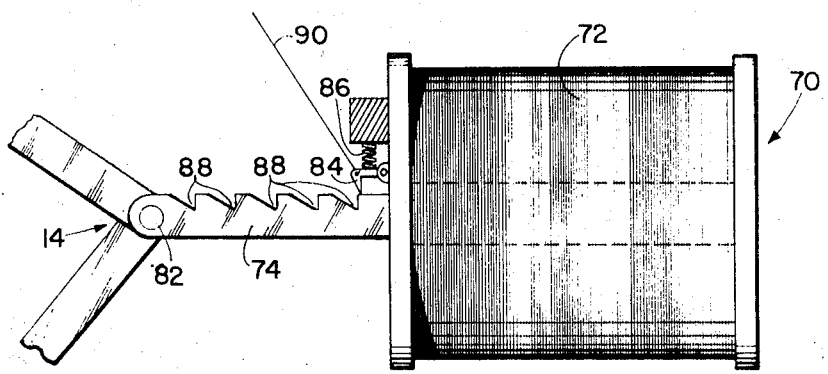
FIG. 4 is an enlarged view of a portion of the apparatus of FIG. 3.

Turning now to the embodiment of the invention shown in FIGS. 3 and 4, an alternate construction is shown for the means for operating the brakes in response to movement of the vehicle. The same reference numerals are used to indicate portions of the apparatus common to the FIGS. 1 and 3 embodiments. In FIG. 3 the electric motor, gears, etc., are omitted, although it will be understood that these may be included as in FIG. 1, if desired, to provide the push-button operation which allows someone other than the operator to apply the brakes while the vehicle is moving.

The FIG. 3 embodiment includes solenoid 70 having the usual coil 72 and armature 74, movable to the right, as seen in FIG. 3, in response to a flow of current through the coil. Solenoid 70 is connected to opposite terminals of battery 42 by electrical leads 76 and 78. Switch S3 is interposed in lead 76 and is opened and closed by means of movable cylinder 66 which requires insertion of key 78 for movement, as in FIG. 1. Switch S4 is interposed in lead 78 and is operatively connected to transmission 56, as indicated diagrammatically by dotted line 80. This connection is made by any suitable means which will move switch S4 from a normally open to a closed position whenever the tarnsmission, drive shaft, or any other part essentially movable in response to movement of the vehicle, is moved.

Armature 74 is connected to linkage 14 at some convenient point, such as that indicated by the reference numeral 82, so that movement of the armature to the right will be effective to apply the brakes. As best seen in FIG. 4, pivoted latch member 84 is biased by spring 86 toward engagement with notches 88 in an edge of armature 74. Flexible cable 90 is attached at one end to latch member 84 and at the other end to manually engageable handle 92, arranged at some convenient locaton within the operator compartment of the vehicle. Thus, a flow of current through coil 72 will result in movement of armature 74 to the right, this movement being transmitted through linkage 14 and shaft 18 to piston 24, thereby applying the brakes until a resistance to movement of piston 24 is encountered which is stronger than the force of solenoid 70. At this point the brakes will be locked due to the engagement of latch member 84 with one of notches 88, which may be provided in any desired number and spacing.

As previously explained, both switches S3 and S4 must be closed to provide the flow of current necessary to energize solenoid 70. Switch S4 is closed in response to movement of the vehicle and opens as soon as the vehicle stops. Therefore, solenoid 70 remains energized for only a short time since the automatic application of the brakes stops the vehicle, thus allowing switch S4 to open again. The brakes have already been locked, however, when the solenoid is de-energized; although manual movement of handle 92 will serve to unlock the brakes, a further attempt to move the vehicle will immediately lock them again so long as switch S3 is closed. Thus, the vehicle may be moved only by the person in possession of key 68 which is necessary to open switch S3.

If desired, cylinder 66 may be the usual key-operated switch means used to operate the ignition system for starting the vehicle engine. Switch S3 may be incorporated therewith so as to be open whenever the ignition key is in the "on" or operating position, and closed when the ignition is "off." Thus, the anti-theft apparatus will be automatically placed in operative condition, i.e., with switch S3 closed and switch S4 ready to be closed as soon as the vehicle is moved, whenever the ignition key is turned off.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a vehicle brake system having a member movable in one direction to apply said brakes and in the opposite direction to release said brakes, operating means for effecting movement of said member in said one direction, said operating means comprising, in combination:
   (a) a source of electrical power;
   (b) solenoid means operable in response to said electrical power to move said member in said one direction;
   (c) first switch means operable in response to movement of the vehicle to supply said power to said drive means; and
   (d) second switch means operable by an element movable only when a particular key is inserted therein, both said first and second switch means requiring operation in order to supply said electrical power to said solenoid means.

2. The invention according to claim 1 and further including latch means releasably engageable with the armature of said solenoid to maintain said armature in the position to which it is moved by energization of said solenoid when said first and second switch means are operated.

3. The invention according to claim 2 wherein said armature is so connected to said member movable to apply said brakes that movement of said armature when said solenoid is energized moves said member in said one direction.

References Cited

UNITED STATES PATENTS

| | | | |
|---|---|---|---|
| 2,354,687 | 8/1944 | Keith et al. | 180—82.7 |
| 2,588,815 | 3/1952 | Fasolino | 180—82 |
| 2,734,590 | 2/1956 | Hays | 180—110 X |
| 2,834,438 | 5/1958 | Riddle | 188—106 |
| 2,990,903 | 7/1961 | Stingel et al. | 180—82 |
| 3,011,040 | 11/1961 | De Remer et al. | 180—82 |
| 3,119,458 | 1/1964 | Fritz | 180—82 |
| 3,186,508 | 6/1965 | Lamont | 180—82 |

FOREIGN PATENTS

| | | |
|---|---|---|
| 457,199 | 7/1913 | France. |

KENNETH H. BETTS, Primary Examiner

U.S. Cl. X.R.

188—110